(12) United States Patent
Saba (10) Patent No.: US 6,443,747 B2
(45) Date of Patent: Sep. 3, 2002

(54) ELECTRICAL CONNECTOR WITH SHORTING DEVICE

(75) Inventor: Toshikazu Saba, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/910,993

(22) Filed: Jul. 23, 2001

(30) Foreign Application Priority Data

Jul. 26, 2000 (JP) ........................................ 2000-224996

(51) Int. Cl.[7] .............................................. H01R 29/00
(52) U.S. Cl. ........................ 439/188; 439/315; 439/488
(58) Field of Search ................................. 439/188, 315, 439/488, 485

(56) References Cited

U.S. PATENT DOCUMENTS

| | | | | |
|---|---|---|---|---|
| 5,346,405 A | * | 9/1994 | Mosser, III et al. | 439/188 |
| 5,370,543 A | * | 12/1994 | Hamada et al. | 439/188 |
| 5,670,884 A | * | 9/1997 | Kodama | 324/538 |
| 5,944,547 A | * | 8/1999 | Golab et al. | 439/188 |
| 6,036,515 A | * | 3/2000 | Nakamura | 439/188 |
| 6,039,589 A | * | 3/2000 | LaLange et al. | 439/188 |
| 6,066,001 A | * | 5/2000 | Liptak et al. | 439/607 |
| 6,241,547 B1 | * | 6/2001 | Fukuda | 439/352 |
| 6,257,922 B1 | * | 7/2001 | Shinozaki | 439/489 |

* cited by examiner

*Primary Examiner*—Tho D. Ta
*Assistant Examiner*—Truc Nguyen
(74) *Attorney, Agent, or Firm*—Anthony J. Casella; Gerald E. Hespos (57) ABSTRACT

A second tube-side housing (15) is connected to one end of a second tube (14). A fit-in space (51) in which a wall-side housing (19) is capable of fitting is formed at the side, of the second tube-side housing (15), opposite to the side thereof in which the second tube (14) is fitted. A pair of detection terminals (70) is mounted on an upper portion of the second tube-side housing (15), with the detection terminals (70) connected to one end of an electric wire (D1). A slide (33) is longitudinally slidably installed on a continuity inspection portion (52) accommodating the detection terminals (70). The slide (33) accommodates a short-circuit terminal (36) capable of electrically connecting the detection terminals (70) to each other. When both housings (15, 19) fit on each other normally, the slide (33) is pressed toward the housing (15), and the short-circuit terminal (36) short-circuits detection terminals (70).

9 Claims, 11 Drawing Sheets

ELECTRICAL CONNECTOR WITH SHORTING DEVICE

BACKGROUND OF THE INVENTION

1. Field of the Invention

The present invention relates to a connector.

2. Description of the Related Art

A blow-by gas collection piping system mounted on a vehicle has a plurality of tubes that connect an engine and an air intake duct to each other. Blow-by gas that has leaked from the space between the cylinder of the engine and the piston is fed it back to the air intake duct and reutilized. Thus, the blow-by gas is prevented from being discharged to the atmosphere.

Maintenance of the blow-by gas collection piping system may require removal of a connection portion between tubes. A visual check then is performed to determine whether the connection portion has been reconnected to the tubes.

However, the engine can be operated, even though the connection portion is removed from the tubes. In this case, the blow-by gas is discharged to the atmosphere if the engine is driven without noticing that tubes are disconnected from each other.

SUMMARY OF THE INVENTION

The present invention has been made in view of the above-described situation. Accordingly, an object of the present invention is to provide a connector that allows an operator to detect whether a connection portion has been removed from a tube.

To achieve the object, in the present invention, there is provided a connector having a pair of first housings and a second housing that can be fit on one of the first housings. Two metal fittings are provided on the first housings or the second housing. The metal fittings are placed in an unconductive state when the housings are not placed in a fit-on position. However, the metal fittings are placed in a conductive state when the housings are placed in the fit-on position. The first housing has a short-circuit terminal displaceable between a conductive position at which the housings are placed in the conductive state and an unconductive position at which the housings are placed in the unconductive state. An urging member is provided for urging the short-circuit terminal to the unconductive position from the conductive position, when the housings are not placed in the fit-on position.

Preferably, the second housing can be fit on the first housing is provided on an outer wall of a device, such as an engine or the like. The second-side is the side from which it is difficult to move the device, as compared with the first-side.

Preferably, each of the housings is provided at an end of a fluid-passable tube; the first housing has a cylindrical portion connectable to the second housing and a continuity inspection portion provided adjacent the cylindrical portion and accommodating the detection terminals and the short-circuit terminal. The continuity inspection portion has a slide for sliding the short-circuit terminal between the conductive position and the unconductive position. The second housing has a pressing portion that presses the slide to the conductive position in an operation of fitting the first housing and the second housing on each other. The slide slides in the same direction as a direction in which the cylindrical portion fits on the second housing or separates from the second housing. The term "fluid" means gas, liquid, powder, granular material flowing inside a tube. The pressing portion may be provided in the vicinity of the tube.

Preferably, a waterproof member is provided at a mounting portion where the slide is mounted on the first housing and is provided at a mounting portion where electric wires connected to the detection terminals are mounted on the first housing to make the mounting portions watertight. The waterproof member may be provided in the slide member or the first housing. The waterproof member may be provided in the detection terminal or the first housing.

According to the invention, two of the detection terminals are provided on the first housing. The detection terminals become electrically conductive to each other through the short-circuited terminal when the housings are placed at the fit-on position. Accordingly, it is possible to check whether the housings have been normally fitted on each other, by detecting whether the detection terminals are electrically conductive to each other.

The construction for checking whether the tubes are in a normal connection state is provided collectively on the first housing, and it is unnecessary to provide the second housing with an electrical construction or a waterproof construction. Therefore, in the case where the blow-by gas collection piping system is used to collect the blow-by gas from an engine, it is possible to cope with a spatial restriction by mounting the other-side housing on an outer wall of the engine.

When the second housing has been fitted in the cylindrical portion of the first housing, the slide of the continuity inspection portion is placed at the conductive position, because the slide is pressed by the pressing force applied thereto by the pressing portion. On the other hand, when the second housing has been removed from the cylindrical portion, the slide of the continuity inspection portion is placed at the unconductive position because the slide is not pressed by the pressing force applied thereto by the pressing portion. Therefore, it is possible to detect whether the housings have been fitted properly on each other. Further, it is unnecessary to provide the second housing with an electrical connection construction. Thus, the entire construction of the blow-by gas collection piping system can be simplified by providing the second housing on the outer wall of the device.

Let it be supposed that the detection terminals are accidentally conductive to each other owing to penetration of water. Because the mounting portions are provided with the waterproof members, respectively, it is possible to prevent an operator from interpreting the state in which the housings are disconnected from each other for the state in which they are placed at the fit-on position. Further, it is unnecessary to provide the second housing with an electrical construction or a waterproof construction for continuity inspection. It is only necessary to provide the first housing with the continuity inspection portion. Thus, it is possible to simplify the construction of the second housing.

DETAILED DESCRIPTION OF THE PREFERRED EMBODIMENTS

Figure 1:
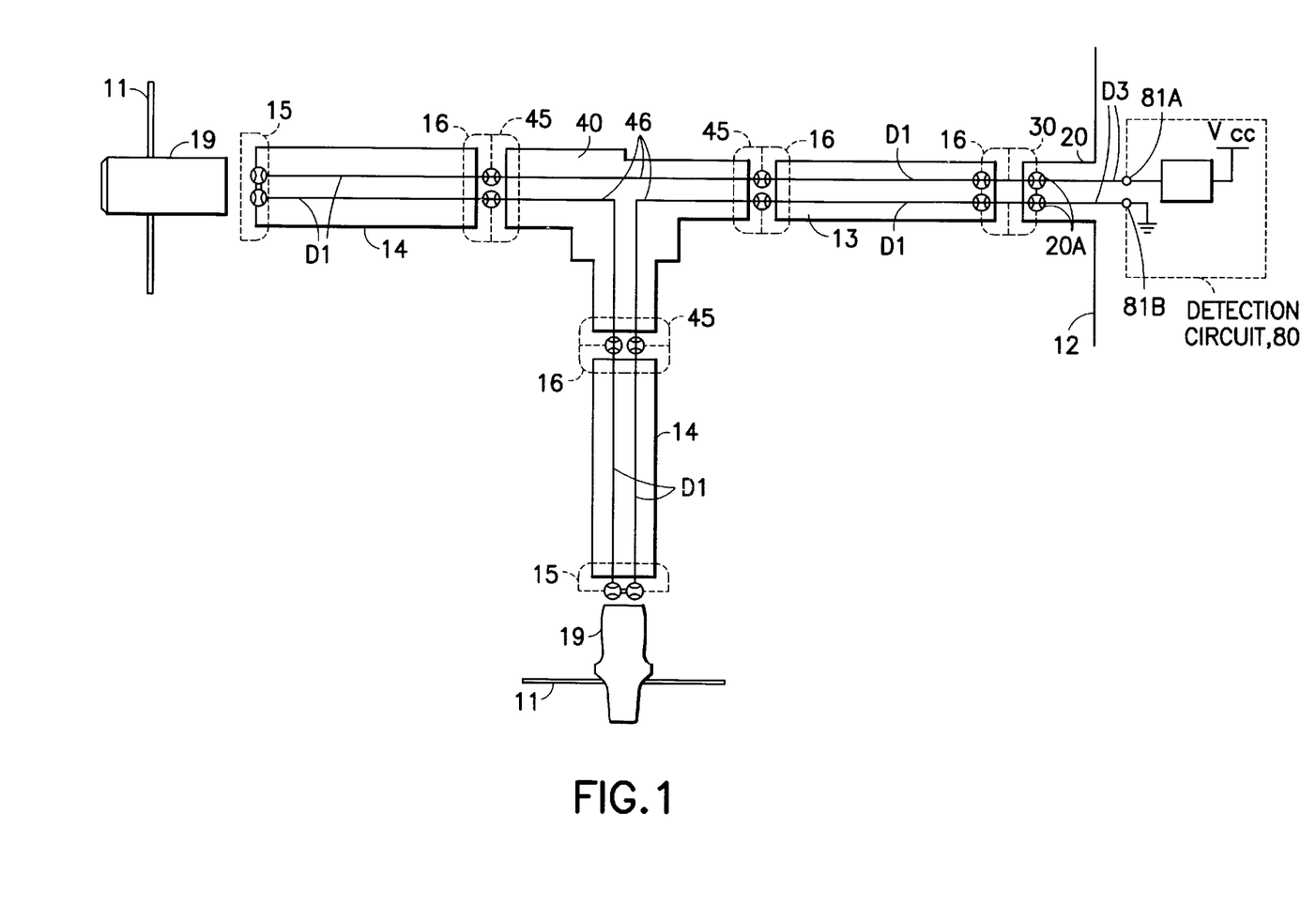
FIG. 1 is a concept view showing a piping system for a blow-by gas according to a first embodiment of the present invention.

FIG. 1 shows the outline of the blow-by gas collection piping system, of the present invention, provided for the engine of a vehicle. The piping system has one first tube 13 and two second tubes 14 that connect an outer wall 11 of a device (for example, a crankcase) of an engine in which the blow-by gas can be generated to an air intake duct 12. The piping system further includes a detection circuit 80 that is capable of detecting whether component parts of the entire blow-by gas collection piping system have been assembled properly.

More specifically, wall-side housings 19 extend from two positions on the outer wall 11 of the device, and a wall-side housing 20 extends from one position on an air intake duct 12. First tube-side housings 16 are installed on both ends of the first tube 13 and are connected to the detection circuit 80. The three tubes 13, 14 and 14 are made of the same synthetic resin and have a small degree of elasticity.

Each second tube 14 is connected to a second tube-side housing 15, which, in turn, is connected to the wall-side housing 19 at the outer wall 11 of the device. The other end of the second tube 14 is connected to a first tube-side housing 16, which, in turn, is connected to a branch portion of a T-pipe 40.

Figure 2:
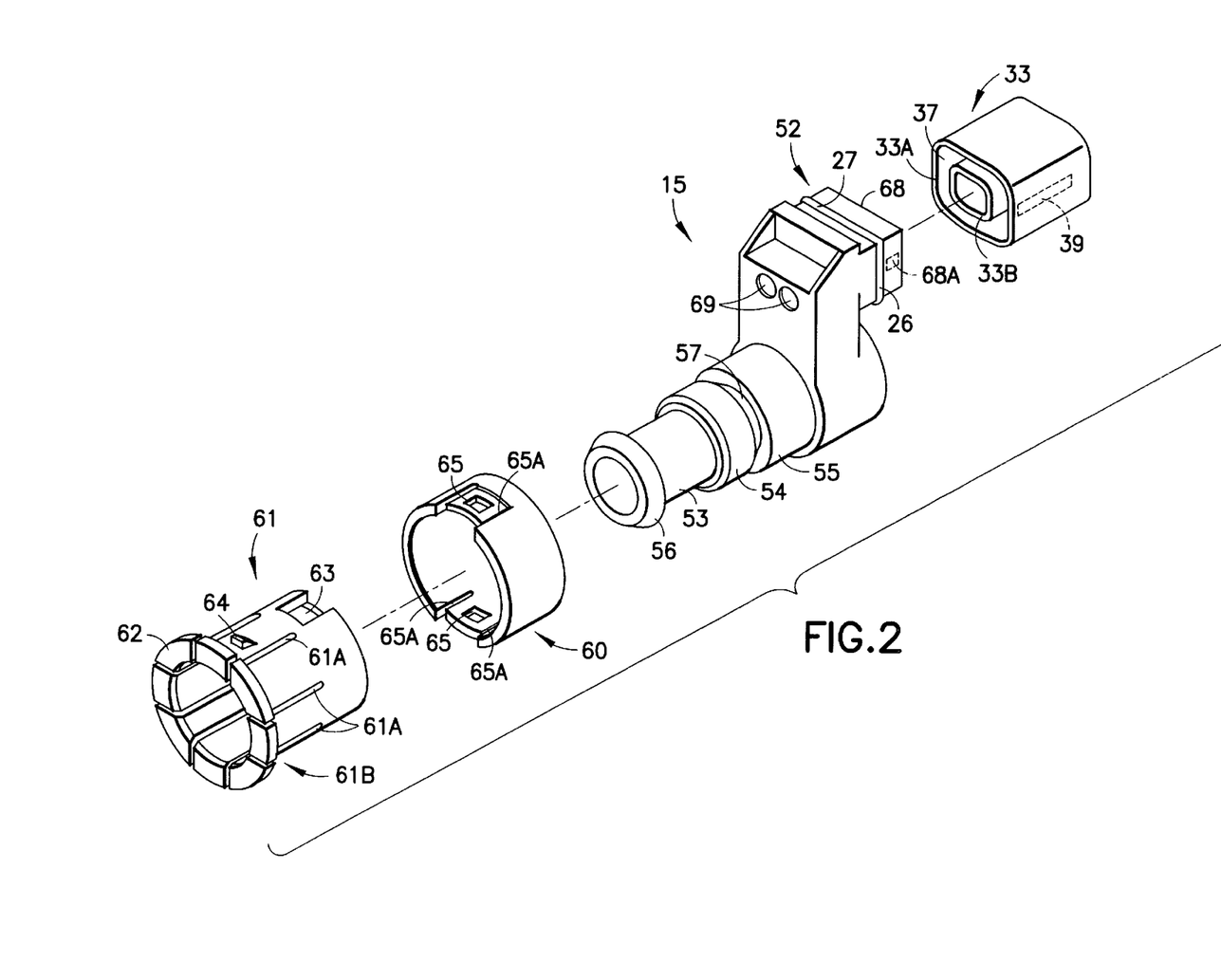
FIG. 2 is an exploded perspective view showing a second tube-side housing.

As shown in FIG. 2, the second tube-side housing 15 is made of synthetic resin. The second tube-side housing 15 connects one end of the second tube 14 and the wall-side housing 19 to each other. A small-diameter cylindrical portion 53, an intermediate-diameter cylindrical portion 54, and a large-diameter cylindrical portion 55 are arranged sequentially from the side of the second tube housing 15 that is to be connected to the second tube 14. A slip-off prevention convexity 56 is formed on the entire circumferential surface of the front end of the small-diameter cylindrical portion 53, and locking groove 57 is formed circumferentially between the intermediate-diameter cylindrical portion 54 and the large-diameter cylindrical portion 55.

Figure 3:
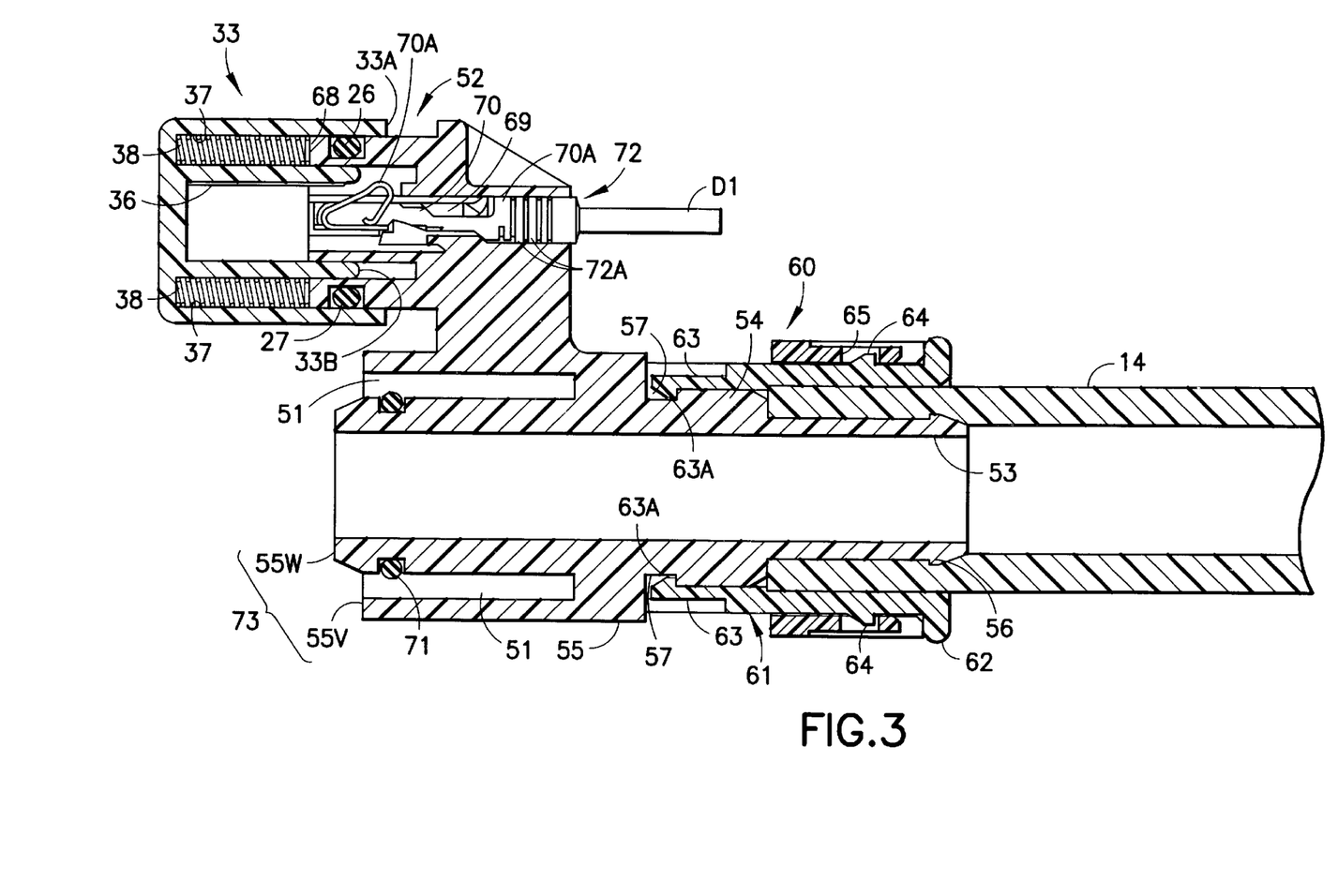
FIG. 3 is a side sectional view showing the second tube-side housing.

As shown in FIG. 3, a cylindrical part 73 is provided at the longitudinal end of the second tube-side housing 15 to which the wall-side housing 19 is connected, which is the side of the second tube-side housing 15 opposite to the side that has the large-diameter cylindrical portion 55.

The cylindrical part 73 consists of an outer cylindrical wall 55V and an inner cylindrical wall 55W, thus forming a double construction. A fit-in space 51 is formed between the outer cylindrical wall 55V and the inner cylindrical wall 55W, and the mating wall-side housing 19 can be fit in the fit-in space 51. The front end of the inner cylindrical wall 55W projects forward beyond the front end of the outer cylindrical wall 55V. An O-ring 71 is fit on a portion of the inner cylindrical wall 55W near the front end of the inner cylindrical wall 55W and at a location covered by the outer cylindrical wall 55V.

A continuity inspection portion 52 is provided at the upper side of the second tube-side housing 15. An open hood 68 is formed at the front side (the side on which the wall-side housing 19 is mounted) of the continuity inspection portion 52, and two terminal-accommodating portions 69 are formed inside the hood 68. A detection terminal 70 is installed inside each terminal-accommodating portion 69. The detection terminals 70 are parallel with each other (perpendicular to the sheet of FIG. 3. See FIGS. 4 and 5) and do not contact each other. Left and right barrel pieces 70B are formed at the rear end of the detection terminal 70. The barrel pieces 70B are integral with the detection terminal 70 and sandwich an electric wire D1 and a waterproof member 72 therebetween. The waterproof member 72 is made of an elastic one-piece rubber material. A plurality of close-contact convexities 72A are formed along the entire outer surface of the waterproof member 72, and each has a diameter slightly larger than the inner diameter of the terminal-accommodating portion 69. Thus, the close-contact convexities 72A are pressed against the inner surface of the terminal-accommodating portion 69 when the detection terminal 70 is inserted into the terminal-accommodating portion 69, and an electric wire D1 of the second tube-side housing 15 has a watertight construction.

An elastic contact piece 70A capable of deforming vertically elastically projects from the upper surface of each detection terminal 70. The elastic contact piece 70A is capable of elastically contacting a short-circuit terminal 36 which will be described later. Mounting projections 68A project inward from right and left side walls of the hood 68 (only one is shown in FIG. 2). Each mounting projection 68A slidably engages a groove 39 of a slide 33 that will be described later. A ring-mounting groove 26 is formed on the center of the entire outer surface of the hood 68, and an O-ring 27 is fit in the ring-mounting groove 26. The O-ring 27 is disposed where the slide 33 is mounted on the second tube-side housing 15, and thus keeps the mounting portion watertight.

The slide 33 is a bottomed cylinder and is mounted on the hood 68, with the short-circuit terminal 36 installed inside the slide 33. As shown in FIG. 3, the slide 33 has an external hood 33A and an internal cylinder 33B disposed inside the external hood 33A. That is, the slide 33 is doubly cylindrical. The front end of the internal cylinder 33B is disposed rearward from the front end of the hood 33A. A spring-accommodating chamber 37 is formed between the external hood 33A and the internal cylinder 33B, and accommodates four springs 38 at the center of vertical and left-to-right directions.

Two slide grooves 39 are formed longitudinally on the outer surface of left and right walls of the internal cylinder 33B in opposed facing relationship to the inner surface of the external hood 33A. Each slide groove 39 has a depth about half of the thickness of the external hood 33A. The slide 33 and the second tube-side housing 15 are connected to each other by fitting the mounting projections 68A into the slide grooves 39. Thus, the slide 33 can slide longitudinally relative to the hood 68. When the slide 33 is mounted on the hood 68, an end of the spring 38 contacts the front end of the hood 68, thus always urging the slide 33 and the hood 68 away from each other. Therefore, in the state in which a pressing force (force of contracting the spring 38) does not act on the slide 33, the mounting projection 68A is located at a position where the mounting projection 68A engages the front end of the slide groove 39.

Figure 4:
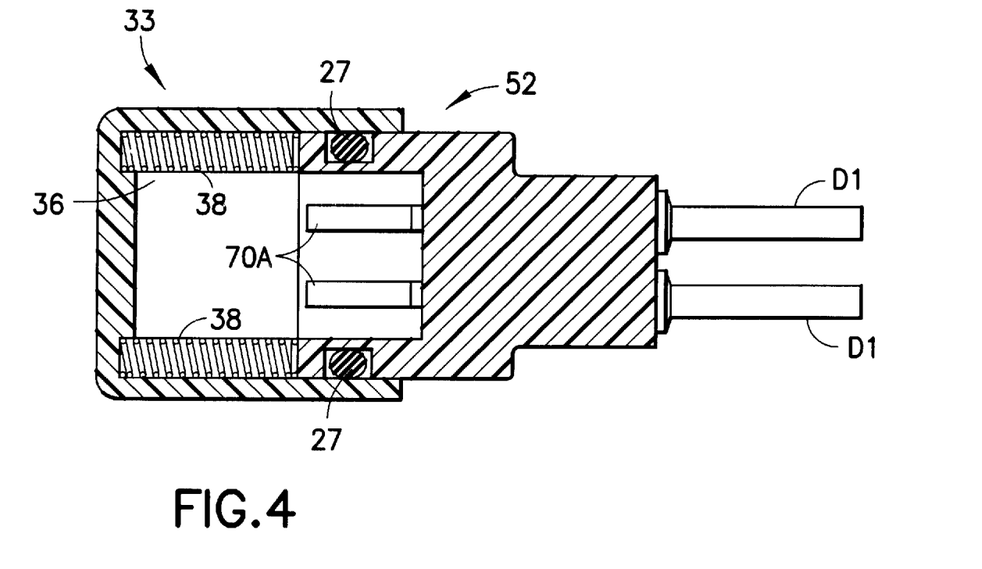
FIG. 4 is a plan sectional view showing a detection member and a continuity inspection portion when a short-circuit terminal is at an unconductive position.
Figure 5:
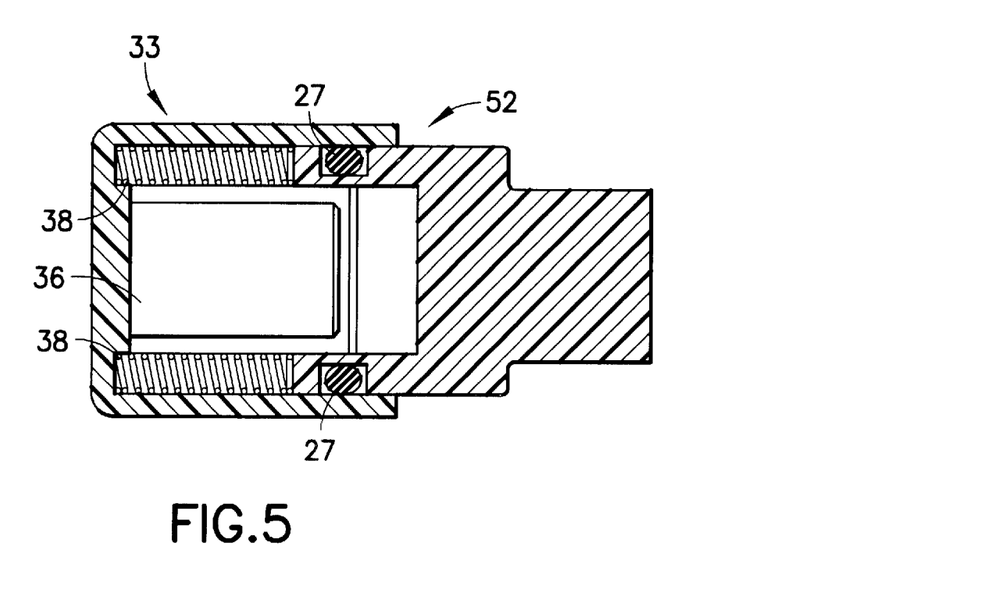
FIG. 5 is a plan sectional view showing the detection member and the continuity inspection portion when the short-circuit terminal is at the unconductive position.

The flat short-circuit terminal 36 is fixed to the inner surface of the upper wall of the internal cylinder 33B. The width of the short-circuit terminal 36 is larger than the separation distance between the elastic contact pieces 70A of both detection terminals 70. When a pressing force does not act on the slide 33, as shown in FIG. 4, the short-circuit terminal 36 and both detection terminals 70 are separated. Both detection terminals 70 are unconductive to each other at the unconductive position. On the other hand, when a force of approaching the slide 33 and the hood 68 to each other acts, the spring 38 is compressed. As a result, as shown in FIG. 5, the slide 33 is moved to a conductive position. At the conductive position, the short-circuit terminal 36 contacts the elastic contact piece 70A of each of the detection terminals 70. Thus, the detection terminals 70 become conductive to each other through the short-circuit terminal 36.

The second tube 14 is fixed to the rear side of the second tube-side housing 15 by fitting a tightening ring 60 and a tightening sleeve 61 on the rear side thereof, which is the side of the small-diameter cylindrical portion 53. The tightening sleeve 61 is made of synthetic resin and has a flange 62 disposed at the longitudinal end on which the second tube 14 is installed. The tightening sleeve 61 has a plurality of slits 61A formed axially from the axial end of the flange 62 to form a flexible tightening portion 61B. The slits 61A separate the flexible tightening portion 61B into a plurality of portions. The flexible tightening portion 61B is flexible in directions that permit the flange 62 to expand or contract radially. Projections 64 are formed respectively on each of the upper and lower surfaces of the flexible tightening portion 61B and are capable of fitting in a locking concavity 65 of the tightening ring 60.

Flexible pieces 63 (only one is shown in FIG. 2) are formed respectively on each of the upper and lower longitudinal ends, of the tightening sleeve 61, opposite to the side on which the flexible tightening portion 61B is formed. The end of the tightening sleeve 61 with the flexible piece 63 is fit on the rear side of the second tube-side housing 15, so that the tightening sleeve 61 accommodates the small-diameter cylindrical portion 53 and the intermediate-diameter cylindrical portion 54 of the second tube-side housing 15. A front projection 63A formed at the inner side of the flexible piece 63 is fit in the locking groove 57 to prevent the tightening sleeve 61 from slipping off the second tube-side housing 15.

The tightening ring 60 has an equal diameter over the whole length, and has upper and lower locking concavities 65 formed at the end thereof on which the tightening sleeve 61 is installed. The locking concavity 65 is defined by forming left and right slits 65A extending inwardly and axially from the longitudinal end of the tightening ring 60 on which the tightening sleeve 61 is installed. The locking concavity 65 is flexible slightly vertically.

Figure 6A:
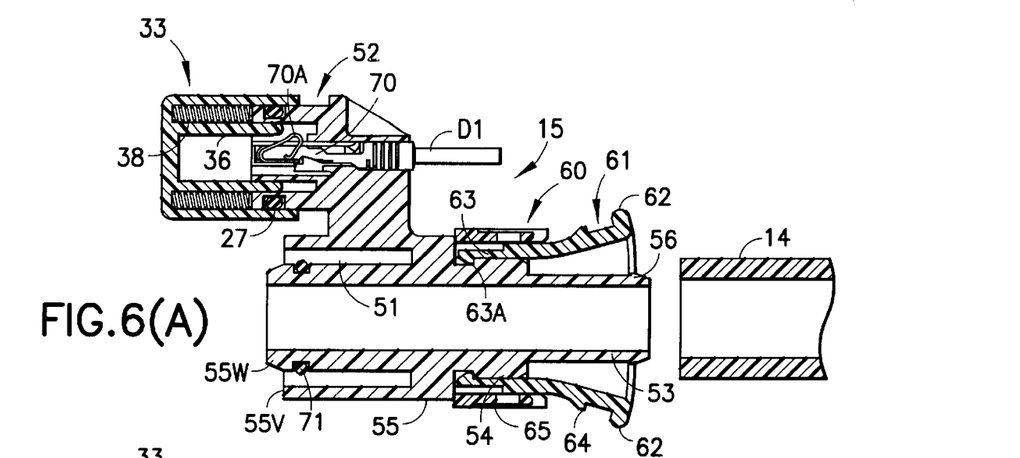
FIG. 6 is a side sectional view showing the procedure of installing a tube on the second tube-side housing.
Figure 6B:
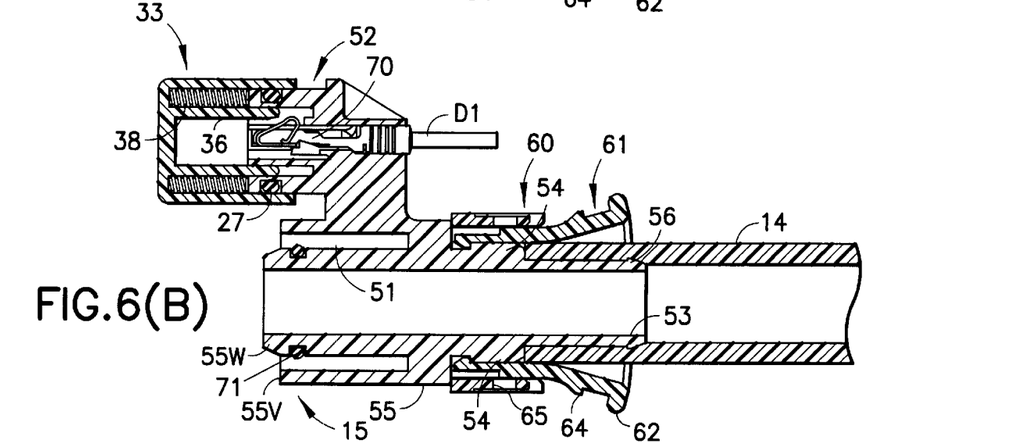
Figure 6C:
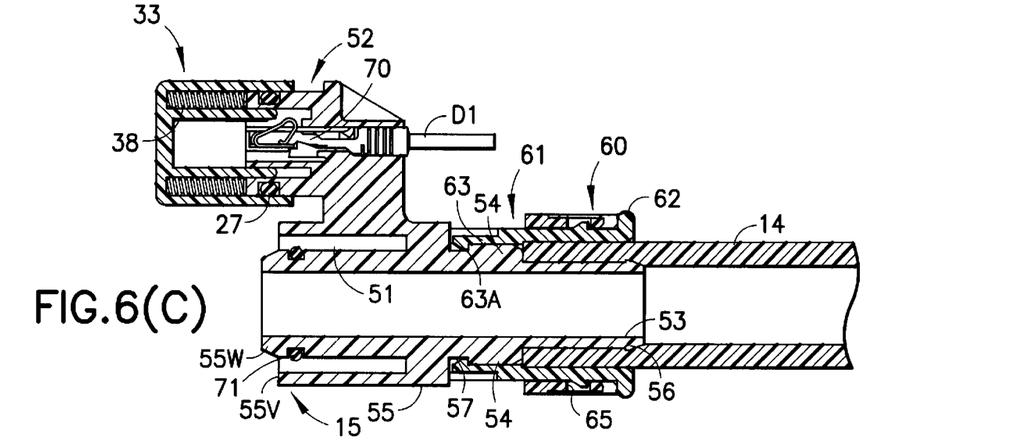

The method of fixing the second tube 14 to the second tube-side housing 15 by means of the tightening sleeve 61 and the tightening ring 60 is described below with reference to FIGS. 6(A)–6(C). At an initial stage (stage at which the second tube 14 has not been mounted on the small-diameter cylindrical portion 53) of the assembling operation, as shown in FIG. 6A, the tightening ring 60 is placed at an untightening position where one axial end of the tightening ring 60 is coincident with the axial end of the tightening sleeve 61 at which the flexible piece 63 is disposed. The end of the tightening sleeve 61 with the flange 62 is expanded radially with the tightening ring 60 located at the untightening position to insert the second tube 14 into the gap between the tightening sleeve 61 and the small-diameter cylindrical portion 53 (see FIG. 6B).

The second tube 14 is pressed into the second tube-side housing 15 until the front end of the second tube 14 contacts the stepped portion of the intermediate portion 54. The tightening ring 60 then is slid to a tightening position where the other axial end of the tightening ring 60 is coincident with the axial end of the tightening sleeve 61 at which the flange 62 is disposed. Thus, the second tube 14 is tightened between the tightening sleeve 61 and the small-diameter cylindrical portion 53 and is prevented from slipping off the second tube-side housing 15. When the tightening ring 60 moves to the tightening position, the projection 64 of the tightening sleeve 61 is locked to the locking concavity 65 of the tightening ring 60. Thus, the tightening ring 60 is prevented from returning to the untightening position.

Other constructions of the blow-by gas collection piping system shown in FIG. 1 will be described below with reference to FIGS. 7 through 9.

The wall-side housing 20 extending from the air-intake duct 12 is made of synthetic resin. The wall-side housing 20 accommodates a pair of connection terminals 20A provided at an end of an electric wire D3 connected to the detection circuit 80. The connection terminals 20A are accommodated inside a housing 30 capable fitting on the first tube-side housing 16.

Figure 7:
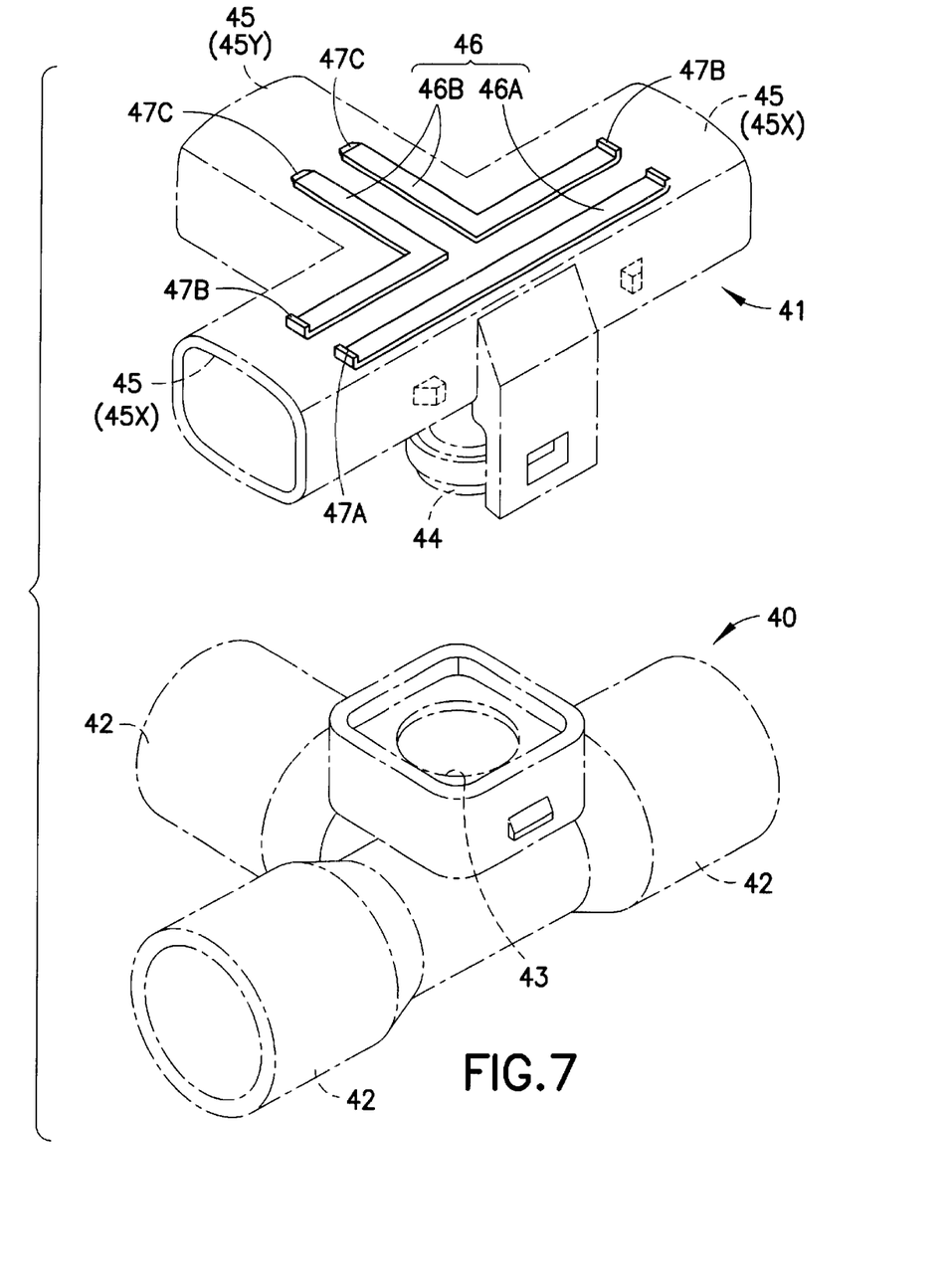
FIG. 7 is a perspective showing a T-pipe.

The T-pipe 40, shown in FIG. 7, is made of synthetic resin, and a connector block 41 also made of synthetic resin is mounted on the T-pipe 40. The T-pipe 40 is literally T-shaped and has connection parts 42 extending in three different directions. A receiving concavity 43 is formed upward on a base portion of the connection parts 42 of the T-pipe 40. A columnar portion 44 that extends vertically from the connector block 41 is fit into the receiving concavity 43 and is welded in position to prevent vibration.

The connector block 41 is T-shaped in correspondence to the external shape of the T-pipe 40 and has three branch portions parallel with the three connection parts 42, respectively. Male connector portions 45X, 45X, and 45Y are formed on the leading end of each of the three branch portions. Three bus bars 46A (first bus bar), 46B and 46B (second bus bar) are embedded in the connector block 41. The first bus bar 46A extends straight between the male connector portions 45X and 45X facing in opposite directions to form one male terminal 47A of each male connector portion 45X. The remaining two second bus bars 46B, 46B are approximately L-shaped, and are arranged adjacently inside the male connector portion 45Y. One end of each second bus bar 46B is exposed to form male terminals 47C and 47C respectively. The other end of each of the second bus bars 46B, 46B is accommodated in the connector block 41, and forms a remaining male terminal 47B of each of the male connector portions 45X, 45X facing in opposite directions.

Figure 8:
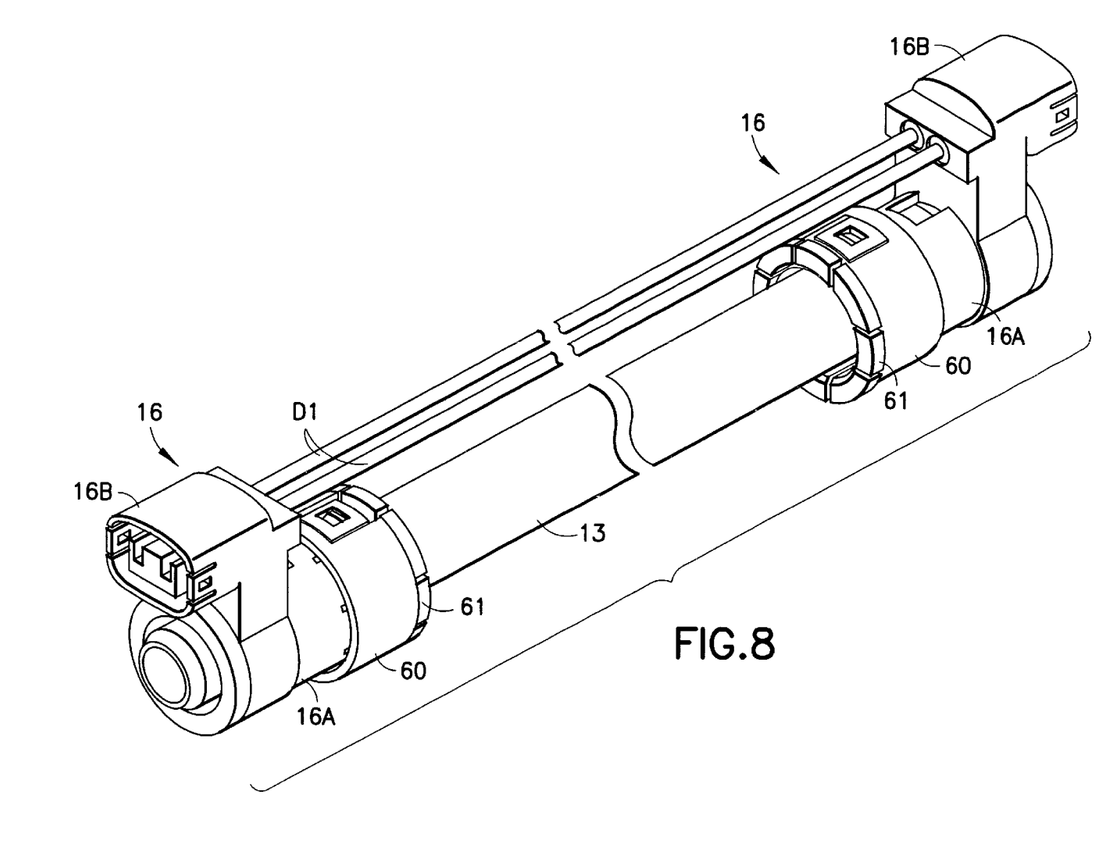
FIG. 8 is a perspective view showing a state in which a first tube-side housing has been installed on both ends of the tube.
Figure 9:
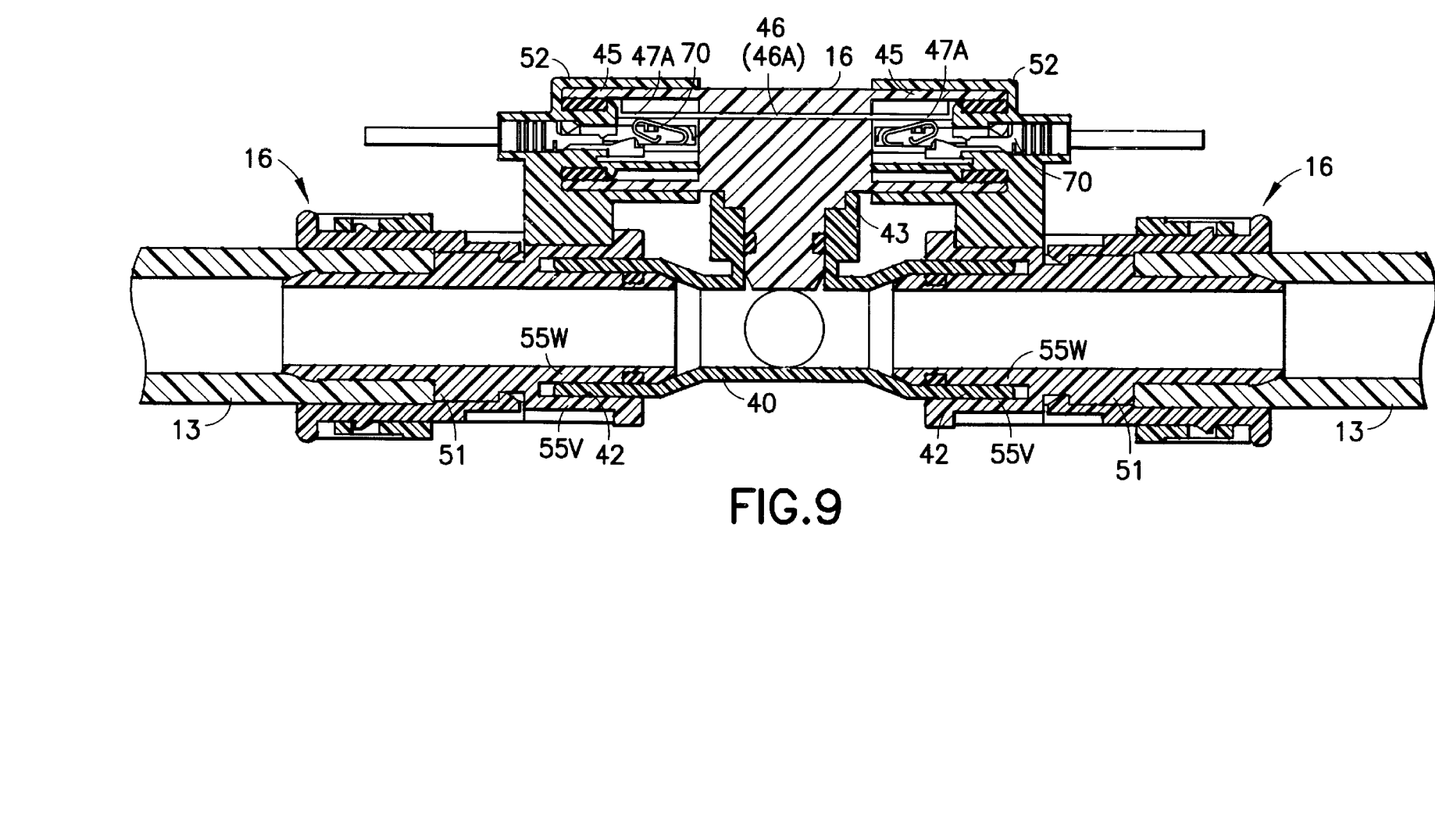
FIG. 9 is a side sectional view showing a state in which a pair of the first tube-side housings has been connected to the T-pipe.

As shown in FIG. 8, the first tube-side housings 16 are fixed to both ends of the first tube 13. A detailed description of the first tube-side housing 16 is omitted herein. However, similar to the second tube-side housing 15, the first tube-side housing 16 has a cylindrical portion 16A with a diameter equal to that of the first tube 13 and a continuity inspection portion 16B that accommodates a pair of the detection terminals 70. The detection terminals 70 accommodated inside each continuity inspection portion 16B are connectable to male terminal fittings 20A and 47. The first tube-side housing 16 has a construction to be locked to the end of the first tube 13, similar to that of the second tube-side housing 15, and including the tightening ring 60 and the tightening sleeve 61; and the construction for fixing the tightening ring 60 and the tightening sleeve 61 to the first tube-side housing 16 is similar to the construction for the second tube-side housing 15.

Two electric wires D1 extend between the housings 16 to connect the detection terminals 70 electrically to each other. One of the first tube-side housings 16 provided at an end of the first tube 13 is fitted on the wall-side housing 20, whereas the other of the first tube-side housings 16 is fitted on the male connector portion 45 of the T-pipe 40 (see FIGS. 1 and 9). Engagement of the first tube-side housing 16 on the male connector portion 45 causes both detection terminals 70 to be connected electrically to the male terminal defined at each end of the bus bar 46 of the male connector portion 45.

The first tube-side housings 16 are fixed to one end of each second tube 14, and the second tube-side housings 15 are fixed to the other ends of the second tubes 14 with the tightening rings 60 and the tightening sleeves 61. The second tubes 14 with the second tube-side housings 15 fixed thereto are connected to each wall-side housing 19 provided on the outer wall 11 of the device. As shown in FIG. 9, the first tube-side housing 16 at the end of the second tube 14 opposite the second tube-side housing 15 is fitted on the male connector portion 45 of the T-pipe 40.

Figure 10:
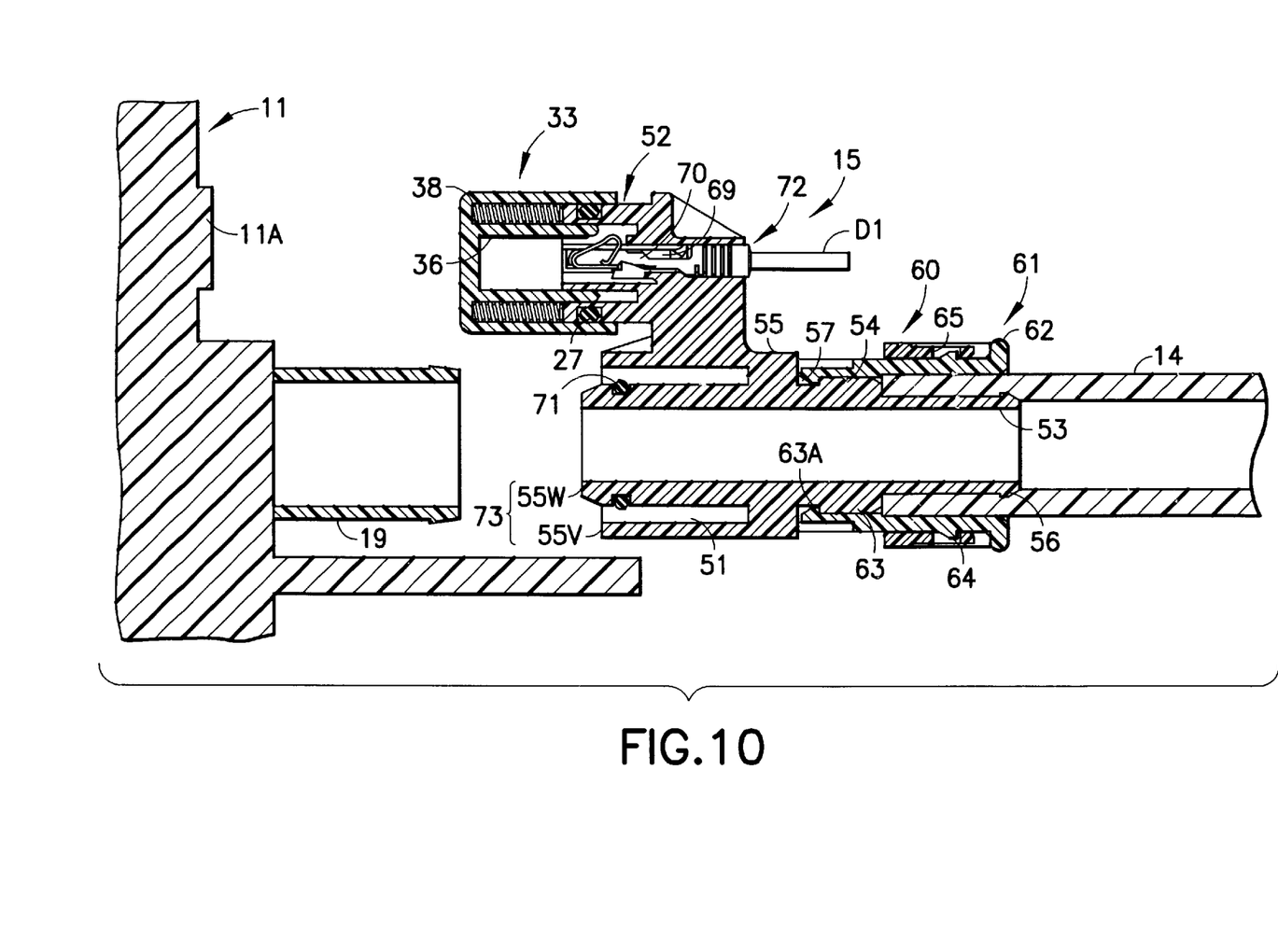
FIG. 10 is a side sectional view showing a state in which the second tube-side housing and a wall-side housing have not been fitted on each other.

The second tube-side housing 15 is fit on the wall-side housing 19, by pressing the cylindrical part 73 of the second tube-side housing 15, consisting of the outer cylindrical wall 55V and the inner cylindrical wall 55W against the wall-side housing 19. This requires matching the position of the wall-side housing 19 with the position of the fit-in space 51, as shown in FIG. 10. At this time, the slide 33 is urged by the spring 38 away from the detection terminal 70, and the short-circuit terminal 36 is at the unconductive position shown in FIG. 4. Therefore, the detection terminals 70 are electrically unconductive to each other.

Figure 11:
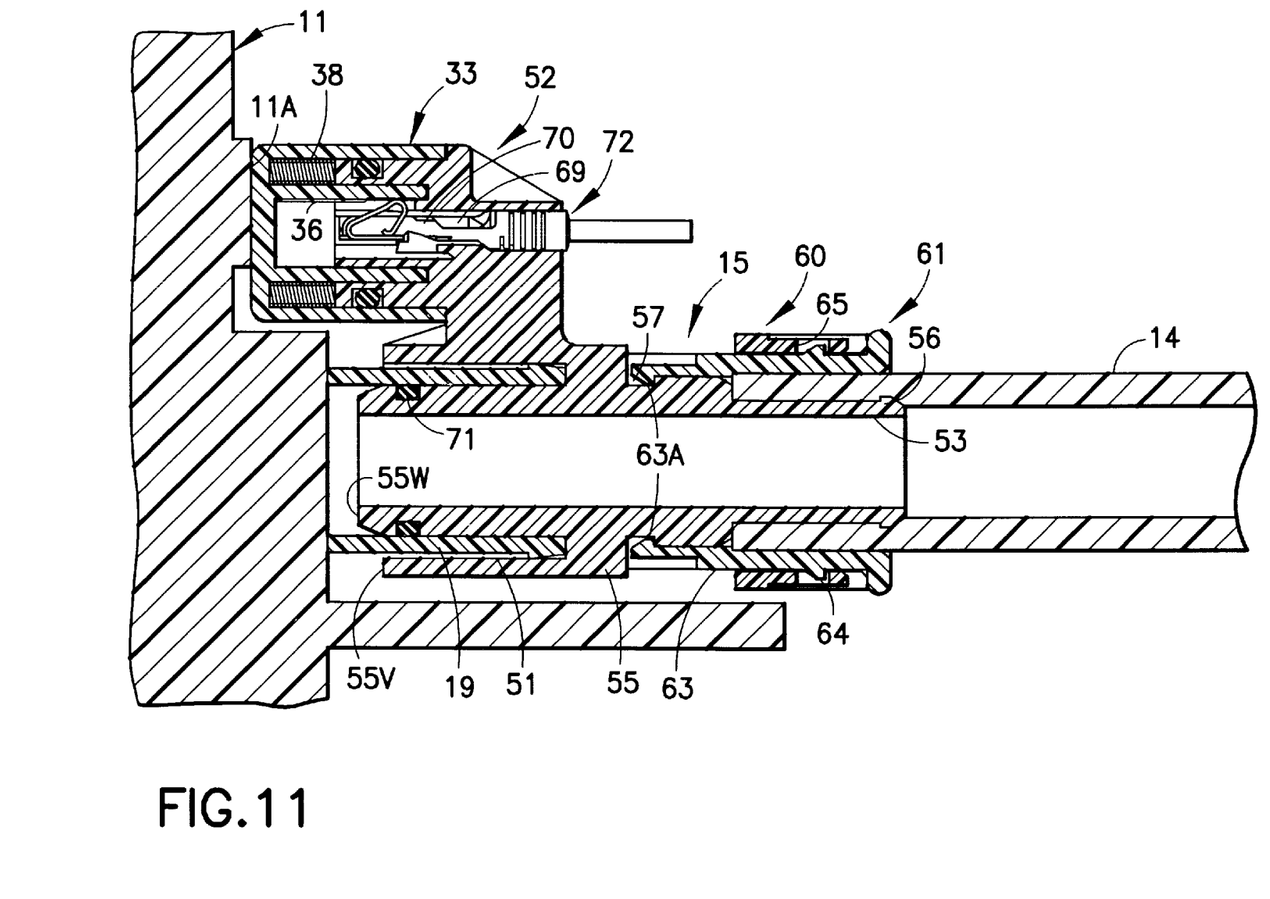
FIG. 11 is a side sectional view showing a state in which the second tube-side housing and the wall-side housing have been fitted on each other.
Figure 12:
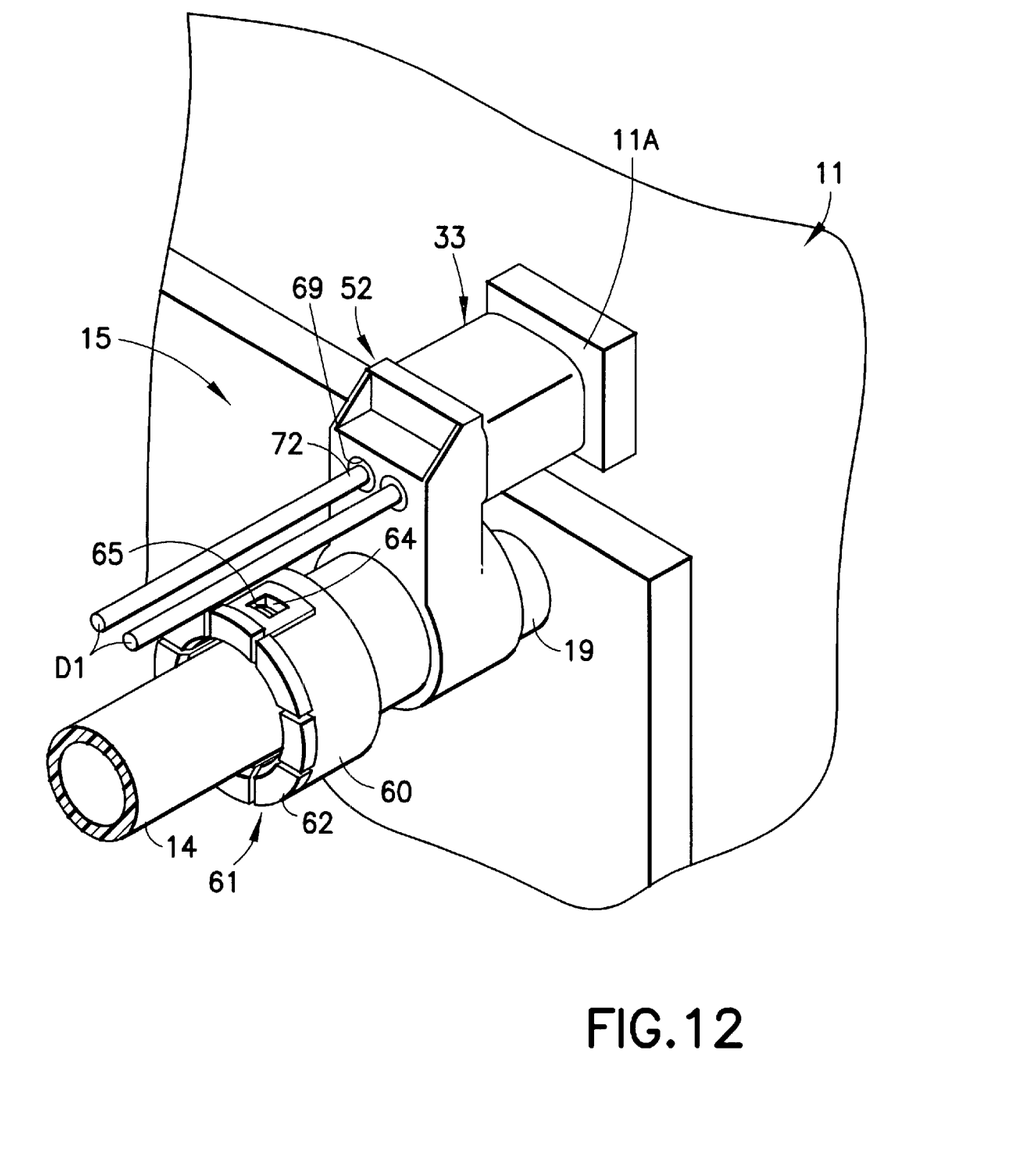
FIG. 12 is a perspective view showing a state in which the second tube-side housing has been fitted on the wall-side housing.

Upon termination of pressing the second tube-side housing 15 against the wall-side housing 19, the wall-side housing 19 is fit into the fit-in space 51 and mounted on the second tube-side housing 15 by means of the outer cylindrical wall 55V and the inner cylindrical wall 55W at a predetermined contact pressure. The O-ring 71 makes the gap between the wall-side housing 19 and the inner cylindrical wall 55W watertight. At this time, the front end of the slide member 33 is pressed by a pressing portion 11A projecting from the outer wall 11 and slid toward the continuity inspection portion 52 against the urging force of the spring 38. As shown in FIGS. 5 and 11, the short-circuit terminal 36 inside the slide 33 is in contact with the elastic contact piece 70A of each detection terminal 70. Thus, both detection terminals 70 are electrically conductive to each other (see FIG. 12).

In this manner, the second tube-side housings 15 at one end of each of the two second tubes 14, the first tube-side housings 16 at the other end of each of the two second tubes 14, and the first tube-side housing 16, 16 at both ends of the one first tube 13 are installed at predetermined positions and form a circuit that includes the electric wire D1, the bus bar 46, the detection terminal 70, and the detection circuit 80. The detection circuit 80 outputs an alarm signal when the circuit is open (any one of the tubes 13, 14 is not connected), whereas the detection circuit 80 does not output the alarm signal when the circuit is closed (the tubes 13, 14 are normally connected).

The blow-by gas collection piping system having the above-described construction operates as described below.

The engine and the detection circuit 80 are actuated by turning on the ignition key of the vehicle. If the tubes 13, 14 of the blow-by gas collection piping system are connected normally, as shown in FIG. 1, the closed circuit composed of the electric wire D1, the bus bar 46, and other members is connected to a pair of detection terminals 81A, 81B of the detection circuit 80. Thus, both detection terminals 81A and 81B of the detection circuit 80 are short-circuited, and the detection circuit 80 does not output the alarm signal. Hence, the second tube-side housing 15 is connected favorably, and no alarm signal is outputted. Thus, it is possible to operate the vehicle normally. Even though a load is applied to the engine while the vehicle is traveling and the blow-by gas is generated, the blow-by gas is sucked by a negative pressure of the air intake duct 12 and fed back to the engine without a discharge to the atmosphere.

The second tube-side housing 15 may be disconnected from the second tube 14 for maintenance of the vehicle and an operator may forget to reconnect one of the second tube-side housings 15 to the second tube 14. In this case, blow-by gas will leak from the second tube-side housing 15. However, the detection terminals 70 inside the continuity inspection portion 52 are not connected to each other by the short-circuit terminal 36, and the detection terminals 81A and 81B inside the detection circuit 80 are insulated from each other. Thus, the detection circuit 80 is actuated by turning on the ignition key, and the detection circuit 80 outputs the alarm signal. Accordingly, the operator notices that any one of the second tube-side housings 15 of the blow-by gas collection piping system is disconnected from the second tube 14, and the operator can connect the second tube-side housing 15 to the second tube 14 to prevent the blow-by gas from being discharged to the atmosphere.

Because no load is applied to the engine when the engine is actuated, the blow-by gas is not generated. Thus, when the second tube-side housing 15 is connected to the second tube 14 after the engine is actuated, it is possible to prevent the discharge of the blow-by gas.

As described above, the detection terminals 70 are provided not on the wall-side housing 19 but on the second tube-side housing 15. The detection terminals 70 become electrically conductive to each other through the short-circuited terminal 36 when the second tube-side housing 15 and the wall-side housing 19 are placed at the fit-on position. Accordingly, it is possible to check whether the second tube-side housing 15 and the wall-side housing 19 have been fit normally on each other, by detecting whether the detection terminals 70 are electrically conductive to each other.

Further, the second tube-side housing 15 and the wall-side housing 19 are provided at the end of the second tube 14. Therefore, it is possible to check whether the tubes of the blow-by gas collection piping system have been connected normally, by detecting whether the detection terminals 70 are electrically conductive to each other.

The O-ring 27 makes the mounting of the slide 33 on the second tube-side housing 15 watertight similarly, the waterproof member 72 makes the mounting of the electric wire D1 on the second tube-side housing 15 watertight. Let it be supposed that the detection terminals 70 and 70 are accidentally conductive to each other owing to penetration of water. Because the mounting portions are provided with the waterproof members 27 and 72, respectively, it is possible to prevent an operator from taking the state in which the second tube-side housing 15 and the wall-side housing 19 are disconnected from each other for the state in which they are placed at the fit-on position. Further, it is unnecessary to provide the wall-side housing 19 with an electrical construction or a waterproof construction for continuity inspection. It is only necessary to provide the second tube-side housing 15 with the continuity inspection portion 52. Thus, it is possible to simplify the construction of the wall-side housing 19.

Further, the construction for checking whether the tubes are in a normal connection state is provided collectively on the second tube-side housing 15, and it is unnecessary to provide the wall-side housing 19 with the electrical construction or the waterproof construction. Therefore, in the case where the blow-by gas collection piping system is used to collect the blow-by gas from the engine, it is possible to cope with a spatial restriction by mounting the wall-side housing 19 on the outer wall 11 of the engine.

In addition, by merely fitting the second tube 14 in the second tube-side housing 15 and moving the tightening ring 60 to the tightening position from the untightening position, the second tube 14 can be mounted on the second tube-side housing 15 unremovably. Therefore, the blow-by gas collection piping system is superior in its operability.

When the wall-side housing 19 has been fitted in the cylindrical part 73 of the second tube-side housing 15, the slide 33 of the continuity inspection portion 52 is placed at the conductive position, because the slide 33 is pressed by the pressing force applied thereto by the pressing portion 11A. On the other hand, when the wall-side housing 19 has been removed from the cylindrical part 73, the slide 33 of the continuity inspection portion 52 is placed at the unconductive position because the slide 33 is not pressed by the pressing force applied thereto by the pressing portion 11A. Therefore, it is possible to detect whether the second tube-side housing 15 and the wall-side housing 19 have been fit normally on each other. Further, it is unnecessary to provide the wall-side housing 19 with an electrical connection construction. Thus, the entire construction of the blow-by gas collection piping system can be simplified by providing the wall-side housing 19 on the outer wall of a device.

The technical scope of the present invention is not limited to the above-described embodiment, but the following modifications are included in the technical scope of the present invention. In addition to the following modifications, the technical scope of the present invention covers the equivalent.

In the above-described embodiment, the connector of the present invention is applied to the blow-by gas collection piping system. But the connector of the present invention is applicable to any type of piping system (for example, piping system for flowing liquid, powder, granular material therethrough), provided that it has a connection portion.

In the above-described embodiment, the connector of the present invention is applied to collect the blow-by gas generated by the vehicle. But the connector of the present invention is applicable to apparatus or devices other than the vehicle.

What is claimed is:

1. A detection circuit assembly having at least one first housing and at least one second housing that can be fit properly in a specified position relative to each other; and a pair of detection terminals provided on each of said first and second housings, the detection terminals of said first and second housings being in an unconductive state when said first and second housings are not fit properly relative to each other, and the detection terminals of said first and second housings being in a conductive state when said first and second housings are fit properly relative to each other, a slide displaceably mounted on said first housing, said slide having a short-circuit terminal mounted in said slide, said slide and said short-circuit terminal being displaceable in unison between a conductive position at which said short-circuit terminal contacts both said detection terminals of said first housing for placing said detection terminals in said conductive state; and an unconductive position at which said short circuit terminal is spaced from said detection terminals of said first housing for placing said detection terminals in said unconductive state; and an urging member for urging said slide and said short-circuit terminal in said slide to said unconductive position when said first and second housing are not fit properly relative to one another.

2. A connector according to claim 1, wherein said first housing is provided on an outer wall of a device, said slide being configured to engage said outer wall and to be moved by the outer wall to the conductive position when said housings are fit properly relative to each other.

3. A connector according to claim 2, wherein each of said first and second housings is provided at an end of a fluid-passable tube; said first housing having a cylindrical portion connectable to said fluid passable tube and a continuity inspection portion provided adjacent said cylindrical portion and accommodating said detection terminals; said continuity inspection portion having the slide for sliding said short-circuit terminal between said conductive position and said unconductive position; said outer wall having a pressing portion pressing said slide to said conductive position during an operation of fitting said first housing on said outer wall; and said slide slides in the same direction as a direction in which said cylindrical portion fits on said fluid passable tube and separates from said fluid passable tube.

4. A connector according to claim 3, wherein a waterproof member is provided at a mounting portion where said slide is mounted on said first housing and provided at a mounting portion where electric wires connected to said detection terminals are mounted on said first housing to make said mounting portions watertight.

5. An electrical connector for checking a connection between a tube and a housing on an outer wall of a device, said connector comprising a tubular portion having a first end, a second end and a flow passage extending between said ends, portions of said tubular portion adjacent said first end being configured for engagement with said tube, portions of said tubular portion adjacent said second end being configured for mating with said housing, a continuity inspection portion mounted to said tubular portion, said continuity inspection portion having a first end facing in a first common direction with said first end of said tubular portion and a second end facing in a second common direction with said second end of said tubular portion, first and second cavities extending through said continuity inspection portion from said first end to said second end thereof, first and second detection terminals mounted in said first and second cavities, a slide mounted to said second end of said continuity inspection portion, said slide having a short-circuit terminal mounted therein, said slide being movable on said continuity inspection portion from a first position where said short-circuit terminal connects both of said detection terminals to a second position where said short-circuit terminal is spaced from at least one of said detection terminals, and a biasing means between the continuity inspection portion and the slide for biasing the slider toward the second position.

6. The connector of claim 5, wherein the slide is disposed in opposed facing relationship to said wall of said device, said slide being dimensioned to be biased by the wall into said first position when said second end of said tube is connected to the housing on the wall of the device.

7. The connector of claim 5, further comprising first and second terminal seals mounted to the respective first and second detection terminals for sealing said first and second detection terminals in said first and second cavities.

8. The connector of claim 5, further comprising first and second detection wires connected respectively to said first and second detection terminals, said detection wires being electrically connected to a detection circuit for generating a signal when said short-circuit terminal is not connected to said first and second detection terminals.

9. The connector of claim 7, further comprising a slide seal mounted to said continuity inspection portion and sealingly engaged with said slide for all movements of said slide between said first and second positions.

\* \* \* \* \*